United States Patent [19]

Cordery

[11] Patent Number: 4,660,058

[45] Date of Patent: Apr. 21, 1987

[54] VISCOSITY SWITCHED INK JET

[75] Inventor: Robert A. Cordery, Danbury, Conn.

[73] Assignee: Pitney Bowes Inc., Stamford, Conn.

[21] Appl. No.: 774,763

[22] Filed: Sep. 11, 1985

[51] Int. Cl.[4] .............................................. G01D 15/16

[52] U.S. Cl. .............................................. 346/140 R

[58] Field of Search .......................... 346/1.1, 140, 75

[56] References Cited

U.S. PATENT DOCUMENTS

| | | | |
|---|---|---|---|
| 3,270,637 | 9/1966 | Clark | 346/140 X |
| 3,790,703 | 2/1974 | Carley | 346/140 X |
| 3,946,398 | 3/1976 | Kyser et al. | 346/140 X |
| 4,164,745 | 8/1979 | Cielo | 346/140 |
| 4,189,734 | 2/1980 | Kyser et al. | 346/140 X |
| 4,216,483 | 8/1980 | Kyser et al. | 346/140 X |
| 4,251,824 | 2/1981 | Hara et al. | 346/140 |
| 4,275,290 | 6/1981 | Cielo | 346/140 X |
| 4,337,467 | 6/1982 | Yano | 346/140 X |
| 4,338,613 | 7/1982 | Cruz-Uribe | 346/75 |
| 4,339,763 | 7/1982 | Kyser et al. | 346/140 X |
| 4,361,843 | 11/1982 | Cooke | 346/1.1 |
| 4,450,457 | 5/1984 | Miyachi et al. | 346/140 |
| 4,468,680 | 8/1984 | Martiner | 346/140 |
| 4,475,113 | 10/1984 | Lee et al. | 346/140 X |
| 4,490,728 | 12/1984 | Vaught | 346/140 X |
| 4,490,731 | 12/1984 | Vaught | 346/140 |
| 4,521,789 | 6/1985 | Jinnai | 346/75 X |

*Primary Examiner*—Joseph W. Hartary
*Attorney, Agent, or Firm*—Peter Vrahotes; Melvin J. Scolnick; David E. Pitchenik

[57] ABSTRACT

In impulse ink jet printing, the method of, and apparatus for, controlling the projection of ink fluid droplets towards a printing surface by controlling the viscosity of the printing fluid at an orifice. An entire array of orifices can thereby be driven by a single pump mechanism. In one embodiment, the printing fluid used may have a liquid crystal polymer in suspension. Electrical fields can be selectively induced, in one instance, to so orient the crystals as to allow droplets to be projected through the orifice and, in another instance, to so orient the crystals as to prevent droplets from being projected. In another embodiment, heaters are provided at the orifice to heat the fluid sufficiently to allow droplets to be projected and a heat sink adequate to cool the fluid when the heater is turned off to prevent the projection of droplets.

4 Claims, 7 Drawing Figures

VISCOSITY SWITCHED INK JET

BACKGROUND OF THE INVENTION

1. Field of the Invention

The present invention relates to a method of projecting printing fluid droplets towards a printing surface, and particularly, to such a method in which projection is controlled by regulating the viscosity of the printing fluid, and further relates to a modified ink jet recorder constructed so as to operate in accordance with the disclosed method.

2. Description of the Prior Art

Ink jet systems, and particularly impulse ink jet systems, are well known in the art. Basically, these impulse systems utilize short pressure pulses to eject ink droplets from an ink chamber through a small orifice or nozzle onto a surface in a specific pattern to form an image. Each droplet results from a pressure wave in the fluid, produced by applying a voltage pulse to a transducer composed, by way of example, of a piezo-electric ceramic material. The term "impulse" or "drop-on-demand" as used in the prior art and in this application refers to ink jet systems in which there is no restriction on the rate (frequency) of ink droplet ejection, other than the recovery time needed to refill the nozzle. That is to say, droplets may be ejected at any desired rate, with or without a pattern, sequence or rhythm.

The principle of an impulse ink jet is the compression of ink and the subsequent emission of ink droplets from an ink chamber through a nozzle or orifice by means of a pump or driver mechanism which is composed of a transducer material (for example, a piezo-ceramic) bonded to a thin diaphragm. When a voltage is applied to the piezo-ceramic material, the material attempts to change its planar dimensions, but because it is securely and rigidly attached to the diaphragm, bending occurs. In an impulse jet, the change in dimensions of the transducer-diaphragm structure due to an electrical impulse is used to apply pressure to the ink. A typical drive voltage required for a 100 micrometer thick transducer to force ink droplets through a nozzle in an impulse fashion might be 100 volts. The impulse might last 20–40 microseconds and produce a driver displacement of 100 micrometers with a resulting pressure of one atmosphere. Refill of the ink after a droplet emerges from the nozzle results from the capillary action at the nozzle. Refill of the jet customarily requires about 100 microseconds, but depends upon the viscosity and surface tension of the ink as well as the impedance of the fluid channels. A negative hydrostatic pressure of about one inch balances the capillary attraction.

Typical disclosures of known impulse ink jet methods and apparatus are presented in the several U.S. Pat. Nos. to Kyser et al, Nos. 3,946,398, 4,189,734, 4,216,483 and 4,339,763. According to those disclosures, fluid droplets are projected from a plurality of orifices or nozzles at both a rate and in a volume controlled by electrical signals. In each instance, each nozzle or orifice requires an associated pump or driver mechanism.

In another known instance, an ink jet system is commercially produced by Hewlett-Packard Corporation under the trademark "Bubble Jet" and is disclosed in U.S. Pat. No. 4,490,728 to Vaught et al. According to the Bubble Jet concept, a heater located behind and spaced from the nozzle raises the temperature of the printing fluid to above the boiling point. The printing fluid thereby changes state from liquid to gas. This causes a bubble to form which displaces the printing fluid and creates a pressure pulse which, in turn, forces a droplet out of the nozzle. Subsequently, the bubble collapses, causing cavitation and, in time, heater degradation. With continued use, the ink jet must eventually be replaced. Another disclosure of this nature is found in earlier U.S. Pat. No. 4,337,467 to Yano.

Exxon Corporation, also, produces a commercial ink jet printer under the trademark Exxon 965 Ink Jet Printer which operates with an oil base ink having a viscosity of approximately 60 cp at room temperature. In that instance, the entire jet head is heated, and not merely individual droplets or nozzles. The higher viscosity ink is reportedly used because it is easier to handle, and specifically, because it does not develop bubbles when it is jostled during transport.

Numerous other patents disclose thermal ink jet printers. Among these are U.S. Pat. No. 4,450,457 to Miyachi et al, No. 4,251,824 to Hara et al which discloses change of state of the liquid to develop a foam, and No. 4,490,731 to Vaught which discloses change of state of the ink dye vehicle from the solid to the liquid state.

In conventional practice, an array of ink jets or ink jet heads requires an associated array of transducers, one transducer for each ink jet. Typically, each transducer is separately mounted adjacent the ink chamber of each jet by an adhesive bonding technique. This presents a problem when the number of transducers in the array is greater than, for example, a dozen because complications generally arise due to increased handling complexities, for example, breakage. In addition, the time and parts expense rise almost linearly with the number of separate transducers that must be bonded to the diaphragm. Furthermore, the chances of a failure or a wider spread in performance variables such as droplet volume and speed, generally increase.

SUMMARY OF THE INVENTION

It was with knowledge of the prior art and the problems existing which gave rise to the present invention. The present invention, then, is directed towards impulse ink jet printing, and specifically, the method of, and apparatus for, controlling the projection of ink or printing fluid droplets towards a printing surface by regulating the viscosity of the printing fluid at an orifice. An entire array of orifices can thereby be driven by a single pump mechanism. In one embodiment, the printing fluid used may have a liquid crystal polymer in suspension. In this embodiment, an electrical field can be selectively induced in one instance to so orient the crystals as to allow droplets to be projected through the orifice and, in another instance, to so orient the crystals as to prevent droplets from being projected. In another embodiment, thin film heaters are provided at an orifice to heat the fluid sufficiently to allow droplets to be projected as well as a heat sink adequate to cool the fluid when the heater is turned off to prevent the projection of droplets.

By reason of the present invention, there is no degradation of nozzles such that they can be used for an almost indefinite period. Furthermore, only one pump or driver is necessary to direct fluid through a large number of nozzles or orifices, perhaps, as many as 20 to 30 nozzles or orifices. For this reason, a much higher linear density of nozzles can be achieved at a significantly reduced cost of manufacture.

Other and further features, objects, advantages, and benefits of the invention will become apparent from the following description taken in conjunction with the following drawings. It is to be understood that both the foregoing general description and the following detailed description are exemplary and explanatory but are not restrictive of the invention. The accompanying drawings, which are incorporated in and constitute a part of this invention, illustrate some of the embodiments of the invention and, together with the description, serve to explain the principles of the invention in general terms.

DETAILED DESCRIPTION OF THE PREFERRED EMBODIMENTS

Figure 1:
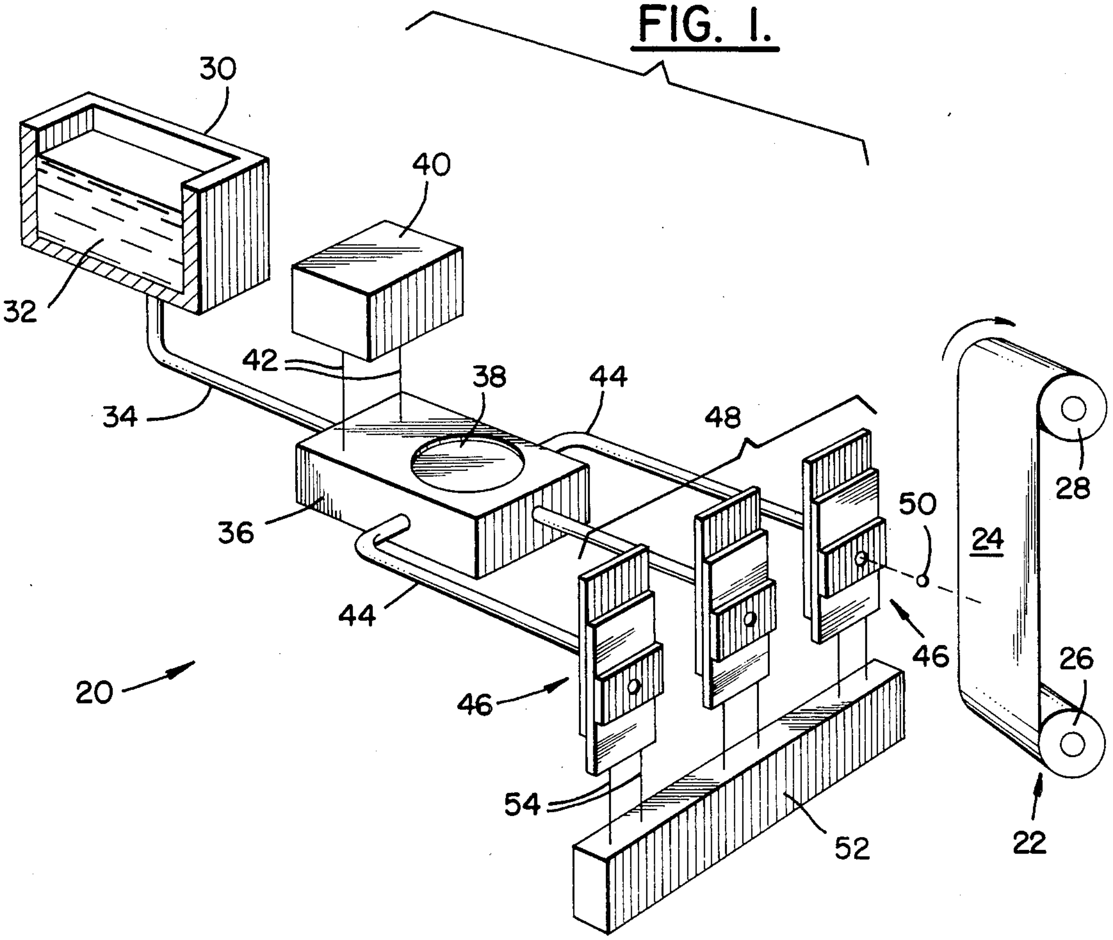
FIG. 1 is a schematic diagram representing a printing system utilizing an ink jet mechanism embodying the present invention.

Turn now to the drawings, and initially, to FIG. 1 which is a schematic representation of recording apparatus 20 embodying the present invention and adapted to record information on a recording medium 22. The recording medium 22 is shown in the form of a web 24 moving relative to the apparatus 20 from a supply roller 26 to a take up roller 28. However, it will be appreciated that relative movement between the recording apparatus 20 and the medium 22 may be in any suitable manner, with actual movement taking place either by the apparatus 20, the recording medium 22, or both. Also the web 24 can be replaced by individual sheets or be in any other suitable form.

The printing apparatus 20 includes a reservoir 30 for ink or printing fluid 32. The ink is fed through a tube 34 to a piezo-electric pump or driver mechanism 36 having a transducer 38 which is pulsed in regular fashion by a suitable electronic pulse generator 40 via appropriate transmission leads 42. Upon receiving a pulse from a generator 40, the pump mechanism 36 causes ink to be discharged via conduits 44, nozzle units 46 or an array 48 of such units. Each nozzle unit 46 is adapted to discharge droplets 50 towards the web 24 according to a timed sequence as directed by a computer 52 shown to be electrically connected thereto by pairs of electrical leads 54.

It has been previously explained that it has been customary in the prior art to use a pump mechanism 36 with each nozzle unit 46. However, one noteworthy feature of the present invention resides in the fact that, as illustrated, only one pump mechanism 36 is required to drive many nozzle units 46. This benefit is achieved by reason of the construction of the invention which is about to be described.

Figure 2:
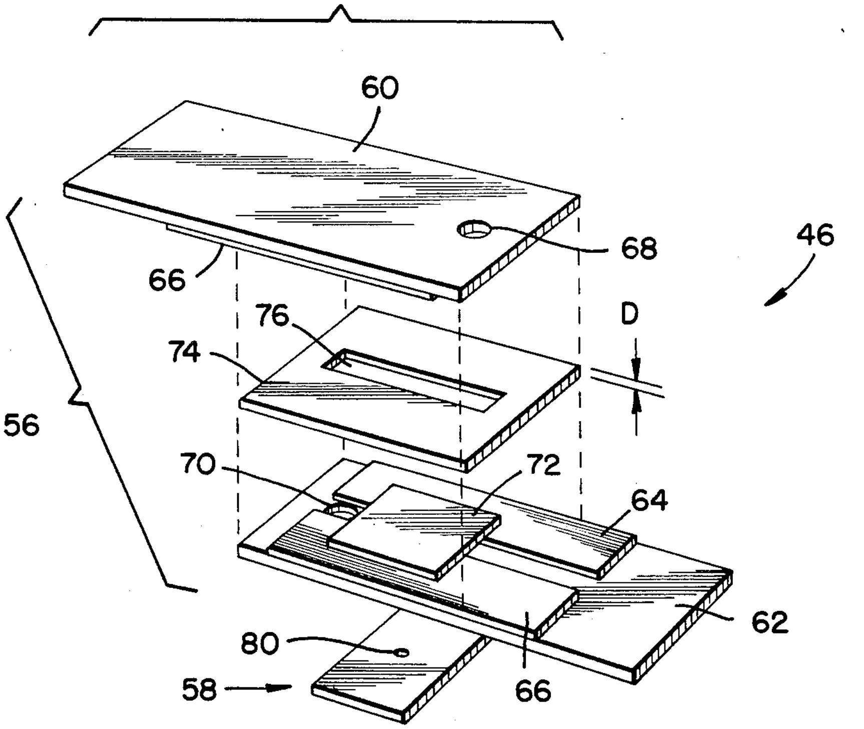
FIG. 2 is an exploded prospective view illustrating one embodiment of a nozzle unit which can be utilized with the system of FIG. 1.

Turn now to FIG. 2 which schematically illustrates a nozzle unit 46 as including a fluid restrictor 56 and a nozzle plate 58. All elements are illustrated as being many times actual size. For example, in FIGS. 2 and 3, the dimension "D" is nominally 0.001 cm., and the dimensions "L" and "W" may both be equal to 0.04 cm. The fluid restrictor 56 may be constructed from a pair of similar glass slides 60 and 62 onto the planar surfaces of which have been deposited electrodes 64 and 66 of copper or other suitable conductive material. The deposition can be performed according to known techniques and the electrodes preferably have a thickness of about 50 nanometers. Each slide is also formed with a relatively large diameter, approximately 0.05 centimeters, hole extending transversely therethrough (see especially FIG. 4). Thus, slide 60 has a hole 68 and slide 62 has a hole 70, each of these holes being positioned between their respective electrodes 64 and 66. Additionally, each of the slides 60 and 62 is provided with a thin film heater 72 which is deposited so as to overlie the electrodes 64 and 66 and be positioned immediately adjacent the holes 68 and 70. A thin film heater is desirable because of its very small size. Other desirable characteristics of the thin film heater as utilized by the invention include its ability to rapidly heat up, then cool down; its ability to achieve a desirable result while heating a minimal mass of ink and of the ink jet itself; and its low energy requirements, and, therefore, efficient and inexpensive mode of operation. The thin film heater 72 can typically be made of nickel to a thickness of approximately 10 nanometers. Although not illustrated, a passivation layer approximately one micrometer thick and composed, for example, of silicon dioxide or a suitable polymer having characteristics as both an electrical and thermal insulator, can be applied over the heater 72 and over the electrodes 64 and 66 to provide protection for the heater and to stop heat transmission short of allowing the fluid to boil as it flows through the device in a manner to be described. Thus, not only does the passivation layer serve to protect the heater from the fluid but also to protect the fluid from the very high heater temperature. It will be appreciated that since the heater is thin, a small amount of energy can raise the temperature considerably.

Figure 3:
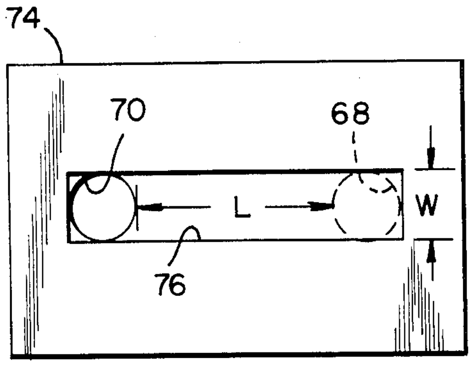
FIG. 3 is a top plan view of a component utilized in the nozzle unit of the FIG. 2 embodiment.
Figure 4:
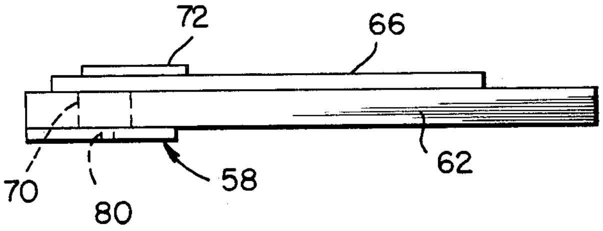
FIG. 4 is a side elevation view of the nozzle unit illustrated in FIG. 2.
Figure 5:
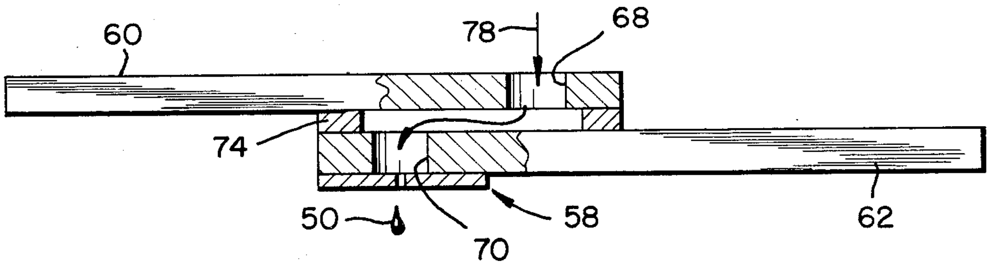
FIG. 5 is a cross-section view of the assembled nozzle unit illustrated in FIG. 2.

To complete the construction of the fluid restrictor 56, a channel plate 74 is interposed between the slides 60 and 62 (see especially FIGS. 2, 3 and 5). In actual fact, the channel plate is another thin film layer, approximately 15 micrometers in thickness, this time made from an electrically insulating material such as Delrin. A channel 76 is formed in the channel plate 74 such that one end of the channel is coextensive with the hole 68 and the other end of the channel is coextensive with the hole 70 when the restrictor 56 is fully assembled as illustrated in FIGS. 3 and 5. Ink from the reservoir 30 and the pump mechanism 36 is seen to flow in the direction of an arrow 78 and successive arrows through the hole 68, viewing FIG. 5, then along the channel 76, through the hole 70, and finally, through an orifice 80 in the nozzle plate 58. The nozzle plate 58 is typically formed of nickel or stainless steel and the diameter of the nozzle 80 is typically 50 to 80 micrometers. In the event the nozzle plate 58 is a thin film, the nozzle 80 can be formed during the electrodeposition process. However, the nozzle plate 58 can also take the form of a metal foil in which event the nozzle 80 can be formed by punching or by drilling. Of course, the invention can encompass the use of nozzles formed in any other suitable manner.

In order to assure the effectiveness of the printing apparatus 20 using the novel nozzle unit 46, a suitable ink must be chosen which has a high viscosity, for example 70 cp at room temperature (approximately 22° C.) and a low viscosity, for example 10 cp, after a 50° C. temperature increase or, approximately at 72° C. One example of an ink which has been found to be acceptable for purposes of the invention has an oil base and is manufactured by Exxon Corporation as Product Number S9424 and disclosed in U.S. Pat. No. 4,361,843 to Lin. The channel 76 has a very small cross-section as compared with the holes 68 and 70 and thereby provides the restriction necessary in order to maintain a pressure at the nozzle 80 sufficient to eject individual droplets 50. Thus, the nozzle unit 46 is operated on a drop-on-demand mode by maintaining oscillating pressure at the entrance to the hole 68 in the slide 60 and pulsing the heater 72 when flow is required. The time that it takes for the heat to diffuse through the fluid as it passes through the channel 76 and towards the nozzle 80 is provided by the following one dimensional heat diffusion equation:

$$t = \tfrac{1}{4} \times D_T^{-1} \times d^2$$

where:

t = time expressed in seconds;

$D_T$ = thermal diffusivity expressed in $cm^2/s$; and d = D/2 = one-half of thickness of channel plate 74 expressed in cm.

Typically, assuming an ink having a thermal diffusivity of 0.005 $cm^2/s$, the diffusion time would be 50 microseconds.

Another meaningful expression is the equation of Poiseuille flow for wide/shallow channels which relates flow rate and pressure, and is as follows:

$$\frac{Q}{P} = R = \frac{W \times D^3}{24 \times \nu \times L}$$

where:

Q is the flow rate expressed as $cm^3$/sec.;

P is the pressure expressed as dynes/$cm^2$;

R is the resistance expressed as ($cm^3$/sec)/-(dynes/$cm^2$);

$\nu$ is the kinematic viscosity expressed as $cm^2$/sec.;

W is the width of channel 76;

D is the thickness of channel plate 74;

L is the shortest distance along the channel 76; between the holes 68 and 70.

Using the aforesaid equation, when the viscosity of the ink is 70 cp (at room temperature), the resistance R of the channel 76 is seven times as large as when the viscosity is 10 cp (at elevated temperatures). To achieve a flow rate of 4,000 droplets per second where one drop is approximately $4 \times 10^{-7}$ $cm^3$, the pressure required is approximately 4 atmospheres at 10 cp and approximately 28 atmospheres at 70 cp. It will thus be appreciated that the power required of the transducer 38 is much less when viscosity is reduced.

A flow rate of 2,000 droplets per second is generally considered to be a minimum if an impulse ink jet is to achieve minimal acceptable standards. In order for such a flow rate to be maintained, the fluid in the orifice would have to be heated, then cooled, in continuous and rapid succession. The entire process would have a time period of 500 microseconds. Allowing for turn-around time of approximately 100 microseconds, the fluid in the orifice would be heated to an elevated temperature within a maximum of approximately 150 microseconds, then cooled to a reduced temperature within a maximum of approximately 250 microseconds. The elevated temperature would be at least 72° C. in order to decrease viscosity of the fluid to less than the range of 20 to 25 cp and thereby assure ejection of droplets from the orifice. The reduced temperature would be approximately 28° C. in order to increase viscosity of the fluid to greater than the range of 20 to 25 cp and thereby prevent ejection of droplets from the orifice. While the reduced temperature could be room temperature, the latter can vary significantly. Thus, for consistency, it is preferred to select a fixed temperature which is somewhat above the normal range for room temperatures. Of course, the thin film heater 72 must have sufficient capacity to enable a droplet in the orifice to reach the elevated temperature during the time permitted. Likewise, the mass of the glass slides 60, 62 or other substrate must be of sufficient magnitude to cool the orifice to hold the next waiting droplet there in position until the next heating cycle occurs. Thus, the slides 60, 62 must be sufficiently massive to provide the magnitude and speed of cooling required for operation of the invention.

Figure 6:
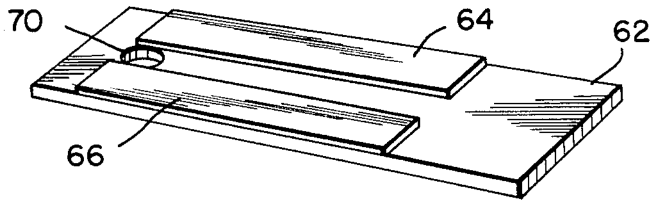
FIG. 6 is a perspective view of a component of another embodiment of the invention.

In a slightly different embodiment, a nozzle unit similar to nozzle unit 46 is employed but the slides 60 and 62 are not provided with heaters 72. However, in all other respects the nozzle unit is the same as previously described. Such a construction is illustrated in FIG. 6.

For operation of this embodiment, an ink is chosen to be of the type having a liquid crystal polymer in suspension. One example of a suitable ink has as its major ingredient hydroxypropylcellulose and is manufactured by Hercules, Inc. under the trademark Klucel. In this particular instance, the liquid crystal polymer is soluble in both water and organic liquids. By regulating an electrical field to which the polymer is exposed, the polymer is alterable between the smectic form and the nematic form. High viscosity is one characteristic of smectic liquid crystals. These have their molecules arranged in definite layers and oriented so that they "stand on end", that is, have the long axes of the molecules perpendicular to the plane of the layer. In contrast low viscosity is a characteristic of nematic liquid crystals. These are less highly ordered than the smectic crystals; while the long axes of the molecules are parallel, they are not arranged in defining layers. Accordingly, by operation of the computer 52, the electrical field created between the electrodes 64 and 66 can be suitably adjusted by changing the applied voltage to cause the liquid crystal polymer to alternate in a desirable fashion between the smectic and nematic forms. A typical voltage to properly orient the liquid crystal polymer might be, for example, approximately 10 volts.

Figure 7:
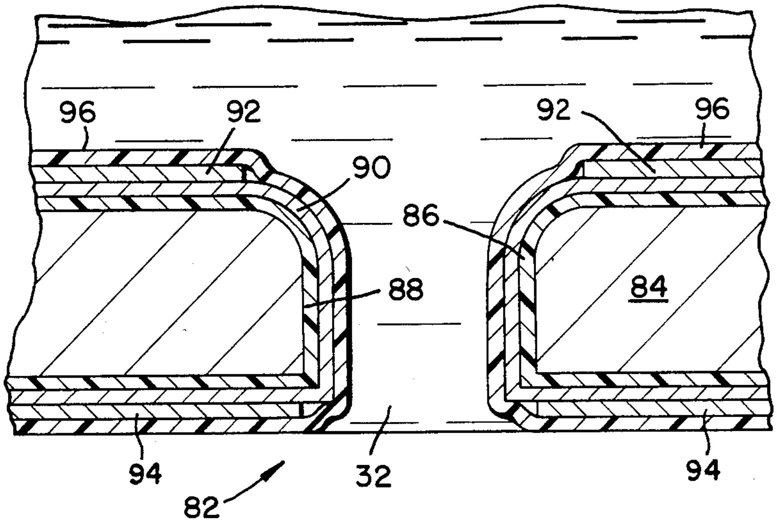
FIG. 7 is a detail cross-section view of the nozzle of yet another embodiment of the invention.

A preferred form of the invention is illustrated in FIG. 7. With reference to that figure, a nozzle unit 82 is utilized in conjunction with the printing apparatus 20 in place of the nozzle unit 46. According to this embodiment, an orifice plate 84, which is 50 to 80 micrometers thick, and preferably composed of nickel or stainless steel, has a suitable nozzle 88 formed therein by any known technique and is coated with a plurality of layers of various materials as will be described. A thermal and electrical insulator 86, sometimes referred to as a passivation layer, approximately 10 nanometers in thickness is first deposited on the orifice plate. This serves to separate the orifice plate 84 from a next layer in the form of a thin film heater 90. The thin film heater also has a thickness of approximately 10 nanometers. Even if the orifice plate 84 is not an electrical conductor, the thermal insulation qualities of the insulator 86 are still of benefit in the construction of the nozzle unit 82. Next, a pair of electrodes 92 and 94 are deposited on opposite sides of the orifice. The electrodes are electrically connected to the heater 90. As with the electrodes 64 and 66, the electrodes 92 and 94 may be composed of copper or other suitable conductive material and have a film thickness of about 20 nanometers. Thereafter, it may be desirable to apply a passivation layer 96 with a thickness of approximately one micrometer to protect the heater from direct contact with the fluid. As previously mentioned, silicon dioxide or a suitable polymer may be acceptable passivation materials for purposes of the invention.

As with the previous embodiment, ink 32 is chosen to have a viscosity (approximately 70 cp) at room temperature (approximately 22° C.) and a low viscosity (approximately 10 cp) at a temperature level 50° C. above room temperature (approximately 72° C.). By means of the pump mechanism 36 and pulse generator 40, an oscillating pressure is maintained in the ink causing meniscus oscillation, but not ejection of a droplet. Ejection is caused by heating the boundary layer of the ink, thereby reducing the viscosity of the ink and the resistance of the nozzle 88. The time for the heat to diffuse a substantial fraction of the radius, for example, 10 micrometers, is approximately 50 microseconds where the thermal diffusivity is approximately 0.5 centistokes. Approximately 10 J of heat are required to heat the ink in the nozzle by 50° C. The pressure drop in the nozzle is approximately five times as large at room temperature as at 72° C. This extra pressure, then, becomes available to eject the droplet.

A primary benefit of the embodiment illustrated in FIG. 7 is its simplicity as compared with the earlier described embodiment. A specific demonstration of this simplicity is the elimination in this embodiment of the need for the restrictor channel 76. Such a channel, or equivalent mechanism, can be eliminated in this embodiment because the fluid resistance of the nozzle itself is used as a restrictor.

The nozzle unit 82 can be modified by eliminating the heater 90 in the same manner as in the embodiment illustrated in FIG. 6. Similar to the operation of the nozzle unit 46 utilizing the change of construction illustrated in FIG. 6, the nozzle unit 82, so modified, can also operate utilizing an ink having a liquid crystal polymer in suspension. In all other respects, the operation of the nozzle unit 82, so modified, is similar to the nozzle unit 56 using the liquid crystal polymer ink.

While the preferred embodiments of the invention have been disclosed in detail, it should be understood by those skilled in the art that various modifications may be made to the illustrated embodiments without departing from the scope thereof as described in the specification and defined in the appended claims.

I claim:

1. Apparatus for projecting printing fluid droplets towards a printing surface comprising:

a reservoir of printing fluid;

an orifice plate having at least one orifice in communication with said reservoir through which the fluid can be projected in droplets towards the printing surface;

pump means for imparting discontinuous pressure pulses to the fluid to cause oscillation of the fluid meniscus within the orifice; and switch means at the orifice including:

a plurality of overlying, contiguous layers formed on said orifice plate in the region of the orifice including, successively:

an inner passivation layer immediately adjacent said orifice plate and composed of thermal insulating material;

a thin film heater overlying said inner passivation layer and operable for heating the fluid to an elevated temperature of at least 70° C. within a maximum of 150 microseconds to enable droplets to be projected through the orifice; and a pair of electrodes formed on opposite sides of the orifice overlying said thin film heater; and an outer passivation layer overlying said pair of electrodes;

said switch means being operable for selectively regulating the viscosity of the fluid at the orifice to thereby control the projection of droplets through the orifice and onto the printing surface in response to a pressure pulse.

2. Apparatus as set forth in claim 1 including:

a heat sink contiguous with the orifice for cooling the fluid in the orifice and effective when said heater is not operating to cool the fluid in the orifice to a reduced temperature of less than 30° C. within a maximum of 250 microseconds to prevent droplets from being projected through the orifice.

3. Apparatus as set forth in claim 1 wherein said inner passivation layer is composed of thermal and electrical insulating material when said orifice plate is metallic.

4. Apparatus as set forth in claim 1 wherein said orifice plate has a thickness in the range of 50 to 80 micrometers and wherein said layers have approximate thicknesses as follows:

said inner passivation layer: 10 nanometers; said thin film heater: 10 nanometers; said electrodes: 20 nanometers; and said outer passivation layer: 1 micrometer.

* * * * *